Dec. 4, 1928.

1,694,263

C. T. HOWSON

CHERRY PITTING MACHINE

Filed Aug. 7, 1925   8 Sheets-Sheet 1

Fig.1.

Charles T. Howson, Inventor.
By Emil Kuchart
Attorney.

Witness:
J.J.Oberst.

Dec. 4, 1928.　　　　　　　　　　　　　　　　　　1,694,263
C. T. HOWSON
CHERRY PITTING MACHINE
Filed Aug. 7, 1925　　　　　　8 Sheets-Sheet 3

Fig. 3.

Charles T. Howson, Inventor.
By Emil Neuhardt
Attorney.

Witness:
J.J.Oberst.

Dec. 4, 1928.

1,694,263

C. T. HOWSON

CHERRY PITTING MACHINE

Filed Aug. 7, 1925

Charles T. Howson, Inventor

By Emil Neubach

Attorney.

Witness:
J.J.Oberst,

Dec. 4, 1928.  
C. T. HOWSON  
CHERRY PITTING MACHINE  
Filed Aug. 7, 1925    8 Sheets-Sheet 5

Fig. 5.

Charles T. Howson, Inventor.
By Emil Kenhart
Attorney.

Witness
J. J. Oberst,

Dec. 4, 1928.

C. T. HOWSON 1,694,263

CHERRY PITTING MACHINE

Filed Aug. 7, 1925

Charles T. Howson, Inventor.

By Emil Kinhart

Attorney.

Witness:
J. J. Oberst.

Dec. 4, 1928. 1,694,263
C. T. HOWSON
CHERRY PITTING MACHINE
Filed Aug. 7, 1925  8 Sheets-Sheet 7

Charles T. Howson, Inventor.
By Emil Neuhart
Attorney.

Patented Dec. 4, 1928.

1,694,263

UNITED STATES PATENT OFFICE.

CHARLES T. HOWSON, OF SILVER CREEK, NEW YORK, ASSIGNOR TO HUNTLEY MANUFACTURING CO., OF SILVER CREEK, NEW YORK, A CORPORATION OF NEW YORK.

CHERRY-PITTING MACHINE.

Application filed August 7, 1925. Serial No. 48,737.

My invention relates to improvements in cherry pitting machines, and more particularly to that type of machines used in canning factories or similar places where machines of large capacity are employed.

One of the objects of my invention is to improve on cherry pitting machines in general to the end that the capacity of the machine, considering its size, is greatly increased, and with a view of effectively pitting cherries with assurance that the pits will be removed from the cherries in clean condition, the pitted cherries positively delivered to a common point without loss, the pits to a second common point, and that the parts with which the cherries and pits thereof come in contact will be presented in a clean condition to incoming cherries to be pitted.

Another object of my invention is to provide a high capacity cherry pitting machine, which is of simple construction, and in which the parts are compactly arranged so that comparatively little space is required for the machine.

Other objects of my invention are to provide improved means for feeding cherries into a machine; improved mechanism for pitting the cherries; improved means for stripping the pitting pins of the pitting mechanism; improved ejector mechanism; improved wiper mechanism, and improved driving mechanism.

With the above and other objects in view to appear hereinafter, the invention consists in the novel features of construction and in the arrangement and combination of parts to be hereinafter described and more particularly pointed out in the subjoined claims.

The reference numeral 18 designates the frame of the machine, which comprises two spaced end members 19, connector members 20, 21 at the lower end of the frame connecting said end members at opposite sides, and an arched top connector member 22 connecting the upper ends of said end members. Said arched top connector member is bolted to the upper ends of the end members by means of bolts 23. The upper ends of said end members are provided with semicylindrical cavities 24, and the extremities of said arched top connector member have corresponding cavities 25, said cavities 24 and 25 forming cylindrical bearings, babbitted as at 26, and in which a drive shaft 27 is journaled. As clearly shown in Fig. 3, this drive shaft has a tight pulley 28 and a loose pulley 29 mounted thereon midway between said end members, around either of which a belt (not shown) is adapted to be passed for rotating said shaft.

Rising from the arched top connector member are guide loops 30 in which a shifter bar 31 is slidably arranged, said shifter bar having handles 32 at opposite ends for conveniently manipulating the same from either end of the machine. Stops 33 are provided on said shifter bar, each of which is adapted to engage a guide loop 30 to limit the movement of said shifter bar.

Figure 1:
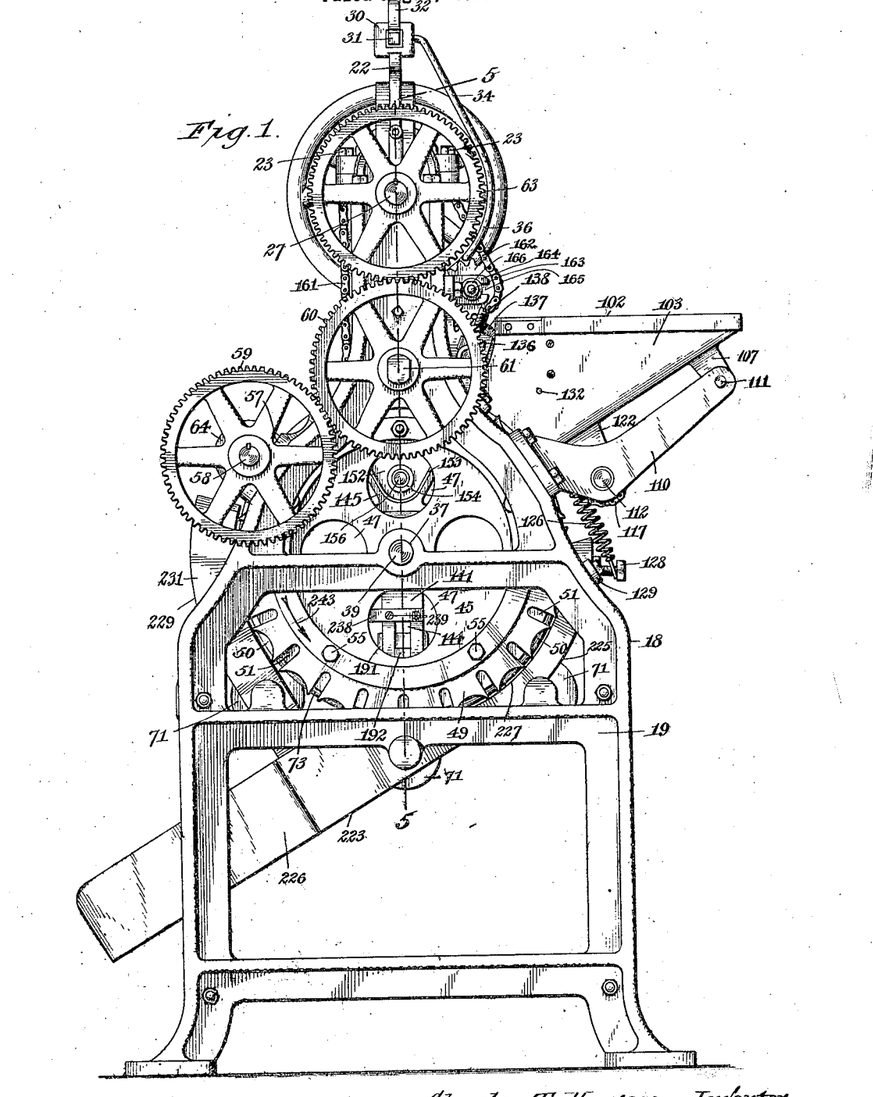
Figs. 1 and 2 are end elevations of the cherry pitting machine, viewed from opposite directions.

Carried by the shifter bar is a shifter arm 34, preferably formed of wire bent in elongated U-formation and having its ends passed transversely through the shifter bar, openings being provided in said shifter bar for this purpose, and in order to retain the ends of said elongated U-shaped wire element on said shifter bar, set screws 35 are threaded into said bar from the top and bear against the end portions of said wire element. As clearly shown in Fig. 1, the wire forming this shifter arm has its lower portion curved, as at 36, to conform to the curvature of the pulleys 28 and 29.

Figure 3:
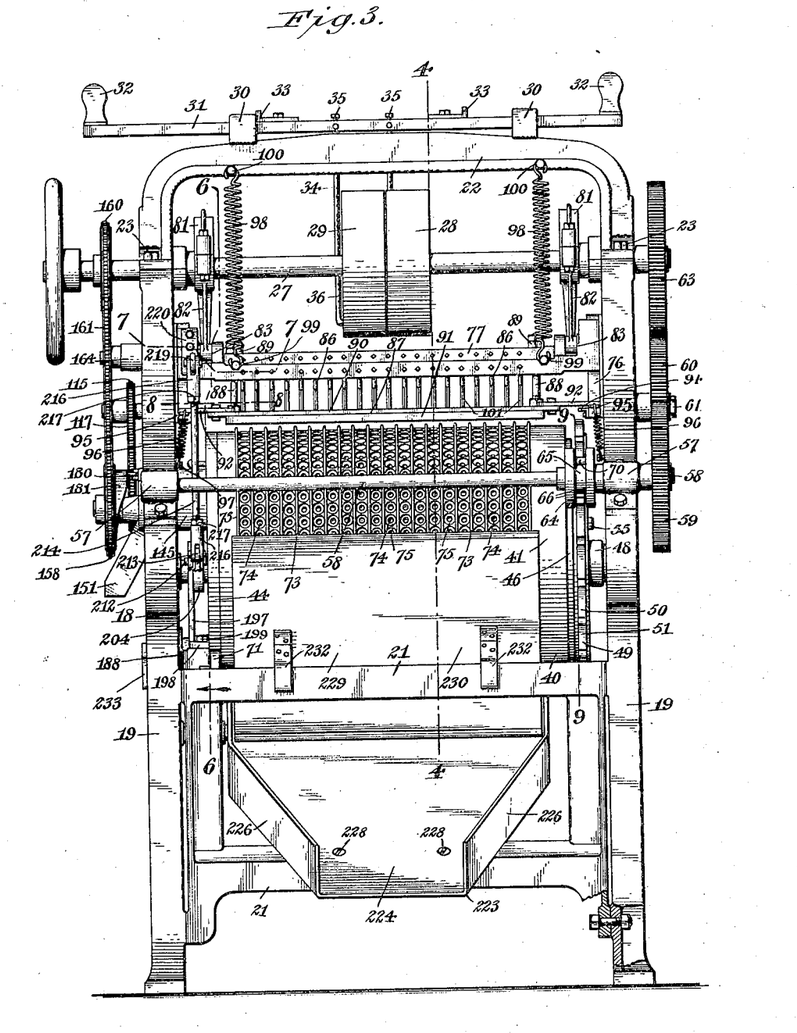
Fig. 3 is a rear elevation of the machine.

As is common in belt shifting devices of this kind, one strand of the belt passes between the two side members of the elongated U-shaped shifter arm and therefore when moving said arm through the medium of the shifter bar 31, the belt may be moved from the loose pulley 29 onto the tight pulley 28, or reversely. As shown in Fig. 3, the shifter arm is positioned to cause a belt used in conjunction therewith to pass around the loose pulley 29, and with the parts in such position, one of the stops 33 bears against one of the guide loops 30, while the other stop 33 is spaced from the other guide loop.

When it is desired to shift the belt from the loose pulley onto the tight pulley, the shifter bar is moved to the right, as shown in Fig. 3, until the stop 33 shown spaced from its co-acting guide loop 30 comes in contact with said guide loop and during this movement the other stop 33 moves away from its co-acting guide loop. In this manner, assurance will be had that a belt passing through the U-shaped shifter arm 34 can be positively shifted from one pulley onto the other, and retained where positioned.

The end members 19 of the frame are preferably of skeleton formation so as to reduce the weight of the same, and each end member comprises comparatively narrow webbed portions disposed vertically, horizontally, and at an angle one to another, and preferably integral. These end members have alined openings 37, 38 formed therein in which a shaft or cylindrical supporting rod 39 is fastened by means of set screws, or otherwise. These openings are preferably formed in corresponding webbed horizontal portions of the frame, and on the shaft or rod 39 is loosely mounted a pitting cylinder or drum 40 having a cylindrical wall 41 provided at one end with an inwardly-directed flange 42, and at its other end with a reduced portion 43 over which is fitted a bearing ring 44; that end of the cylinder or drum provided with said bearing ring being open while the other end thereof having the inwardly-directed flange 42 is closed by a head 45 which fits against the inner edge of said inwardly-directed flange 42 and having an outwardly-directed flange 46 with its inner face against said flange 42. This head is provided with a number of openings 47 spaced equi-distantly around the same, and with an axial outwardly-extending boss 48 providing an elongated bearing for the pitting cylinder. The openings 47 within said head convert the same into substantially a spider, so that in reality the end of the cylinder or drum having said head secured thereto, is not completely closed.

The pitting cylinder or drum is rotatably mounted on the shaft or supporting rod 39, which is non-rotatably mounted within the end members of the frame, and secured to that end of the cylinder having the head 45 applied thereto is the stop wheel 49 of a Geneva movement which wheel depends upon the head 45 as a support for the same. This stop-wheel is in the form of an annulus provided with shallow concaved notches 50 spaced equi-distantly around the periphery of said annulus and with intervening narrow and deep notches 51. Said wheel or annulus has screw holes 52 formed therein at intervals around the same, and corresponding screw holes 53 are formed in the outstanding flange 46 of the head 45, and alined therewith are tapped holes 54 in the inwardly-directed flange 42 of the cylinder or drum. Cap screws 55 are passed through the holes 52 and 53 and threaded into the tapped holes 54 of said inwardly-directed flange, said cap screws serving to clamp the stop wheel or annulus 49 of the Geneva movement against the head 45 of the cylinder, and in turn the outstanding flange 46 of said head is forced in firm contact with the inwardly-directed flange 42 of the cylinder or drum, thereby securely fastening the head 45 of the cylinder or drum to the body portion of said cylinder or drum and the stop wheel or annulus 49 to said head.

Journaled in alined bearings 57 fastened to corresponding edges of the end members 19 is a shaft 58, one end of which extends outwardly beyond one of said bearings 57, and has a gear wheel 59 secured thereto, which is in mesh with a gear wheel 60 rotatable on a spindle 61 threaded into a boss 62 extending outwardly from one of the end members 19. The gear wheel 60 is also in mesh with a gear wheel 63 fastened to the main or drive shaft 27, at one end thereof. On the shaft 58, transversely-alined with the stop wheel 49 of the Geneva movement, which may also be referred to as the driven wheel of said movement is the drive wheel 64 of said movement, which is reduced between its ends, as at 65, to provide two spaced outstanding flanges 66 adapted to lie at opposite sides of the stop or driven wheel 49, the periphery of said reduced portion 65 corresponding to the curvature of the shallow or concaved notches 50 in said stop or driven wheel. Extending through the flanges 66 and across the space between the same is a pin 67 retained in position by a screw 68 threaded into said flange from its peripheral edge and through an opening 69 formed in said pin. Surrounding this pin is a roller 70, which is adapted to enter the deep notches 51 of the stop or driven wheel 49. It will be clear therefore that the cylinder or drum 40 is given intermittent rotary movement from the main or drive shaft 27 through the medium of the gear wheels 63, 60 and 59, the shaft 58 and the Geneva movement, which the members 49 and 64 constitute.

During each revolution of the drive wheel 64, the stop or driven wheel 49 is moved in a rotary direction a distance equaling the space between centers of adjacent concaved notches 50, the movement of the stop or driven wheel and consequently the pitting cylinder or drum to which said stop or driven wheel is secured, taking place through a portion of each revolution of the drive wheel 64 and remaining idle through the remaining portion of each revolution. The drive wheel 64 of the Geneva movement may therefore be said to have an operating movement and an idle movement during each revolution.

The pitting cylinder or drum receives support at one end through the medium of its head or spider 45, and at its other end it is supported by rollers 71 rotatable on bolts passed through spacing sleeves 72 and fastened into one of the end members 19 of the frame, the bearing ring 44 of the cylinder resting upon these rollers and having traveling contact therewith. Said rollers rotate freely on their supports when the cylinder or drum is intermittently rotated by the Geneva movement and parts driving the same.

The pitting cylinder or drum is provided with outstanding peripheral webs or flanges 73 spaced equidistantly along the major portion of the cylinder or drum, and between adjacent webs or flanges a circumferential row of pitting openings 74 is formed through the peripheral wall of the cylinder or drum, said pitting openings being enlarged through the outer end of said wall to form cherry-receiving pockets 75. The pitting cylinder or drum may therefore be said to have a plurality of circumferential grooves in each of which a circumferential row of pitting openings is formed. The pitting openings are arranged in longitudinal rows and spaced circumferentially for use in sets to conform in number to the number of concaved notches 50 or deep notches 51 formed in the stop or driven wheel of the Geneva movement.

On the inner sides of the end members 19, vertical guides 76 are secured, and guided for vertical movement on these guides is a pitting member or plunger 77, designed at opposite ends, as at 78, to fit said guides 76, and secured thereto are retainer pieces 79 serving to hold the ends of said pitting member in slidable contact with said guides.

Secured on the main or drive shaft are spaced eccentrics 80, around which eccentric straps 81 formed at the upper ends of connector arms 82 are passed, the lower ends of said connector arms being pivotally connected to the pitting member or plunger 77, as at 83. During rotation of the main or drive shaft the eccentrics 80 are rotated and in turn cause the pitting member to be reciprocated vertically while guided by the guide 76. Fastened in this pitting member are three horizontal rows of pitting pins 84, 85, 86, the pitting ends of which are normally maintained within a stripper member 87 suspended from said pitting member by supporting bolts 88. These bolts are fastened into the stripper member and are loosely passed through the pitting member 77, nuts 89 being applied to the upper ends thereof to support the stripper member and other parts connected therewith.

Figures 6, 7, 8:
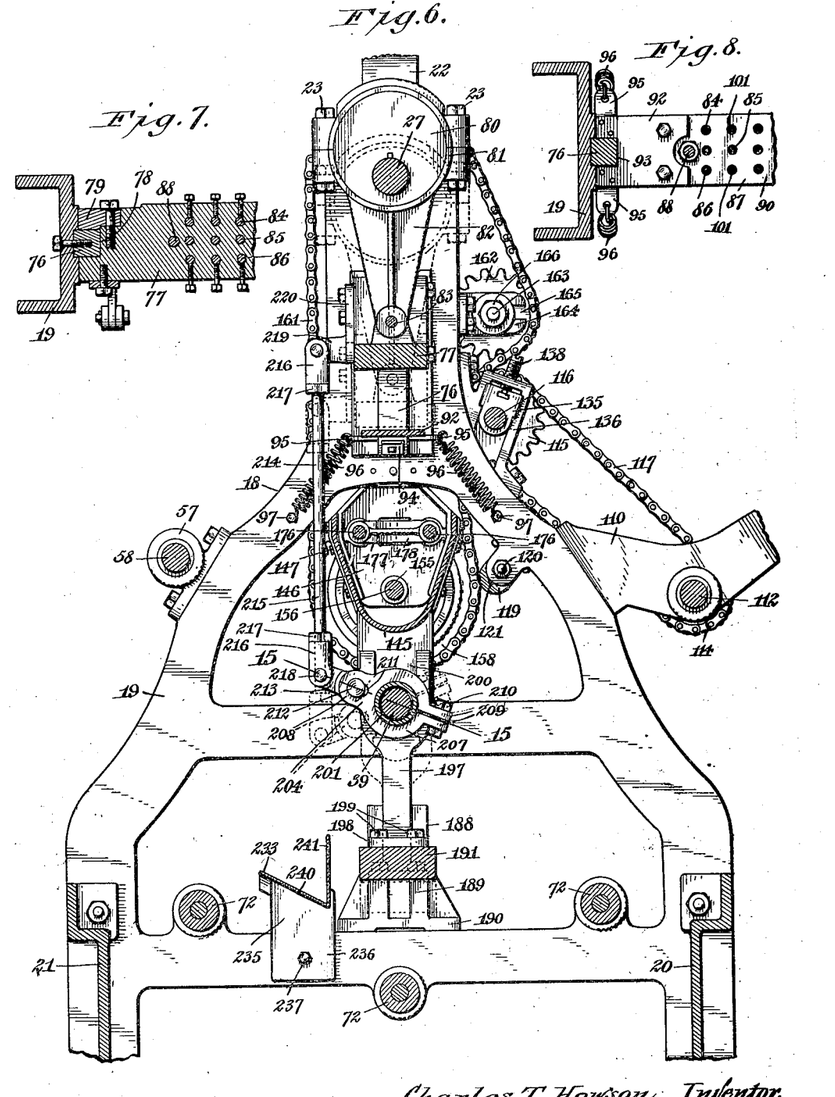
Fig. 6 is an enlarged transverse section taken on line 6—6, Fig. 3, looking in the direction of the arrow crossing said line.
Fig. 7 is an enlarged horizontal section taken on line 7—7, Fig. 3.
Fig. 8 is an enlarged horizontal section taken on line 8—8, Fig. 3.
Figure 9:
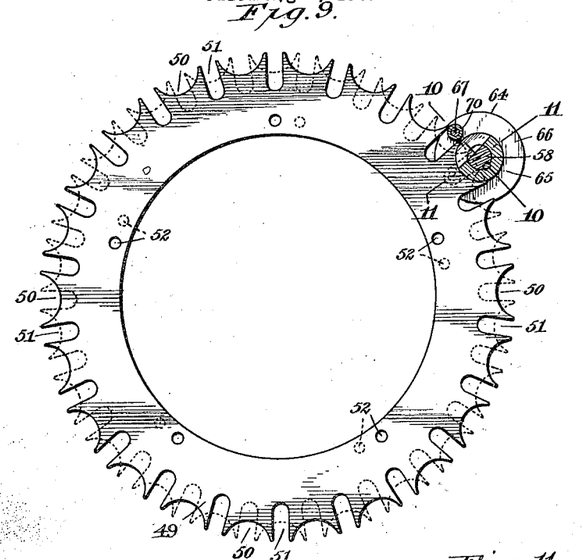
Fig. 9 is an enlarged vertical section taken on line 9—9, Fig. 3, showing the intermittently rotatable mechanism including a Geneva movement.

Said stripper member comprises a flat plate 90 constructed of steel or suitable material, and a plate of aluminum or other non-corrosive material 91 fastened to the under side of said plate 90 by said supporting bolts 88, as clearly shown in Fig. 6. The plate 90 is somewhat longer than the aluminum bar 91 and extends beyond opposite ends thereof. Fastened to said opposite ends are guide strips 92 notched at their outer ends, as at 93, to fit the vertical guides 76. These guide strips 92 are normally held spaced above stops 94 fastened to the inner sides of the guides 76 at their lower ends.

Riveted or otherwise fastened to the under sides of the guide strips 92 are ears 95, which extend laterally from said guide strips in opposite directions, and at each end of the machine a pair of retractile springs 96 is provided, these springs having their upper ends fastened to the outstanding ears 95 of the guide strips 92 and extending downwardly and outwardly and having their lower ends fastened by means of bolts 97, or otherwise, to the inner sides of the end members. The purpose of these springs are to pull the stripper member 87 downwardly and bring the guide strips 92 at opposite ends thereof into contact with said stops 94. However, as stated, the guide strips 92 are spaced from said stops when in normal position, which is that in which the pitting cylinder or drum is held against movement. This spaced relation of the guide strips 92 exists when the throws of the eccentrics 80 are at their highest points, and at such times the nuts 89 at the upper ends of the supporting bolts 88, by reason of their bearing against the upper side of the pitting member or plunger will cause the stripper member 87 to be elevated from the cylinder or drum. At the instant that the pitting cylinder or drum ceases its intermittent rotary movement, in a manner to appear hereinafter, the eccentrics 80 will have moved a sufficient distance to lower the pitting member or plunger 77, with the result that the stripper member will be lowered to cause the guide strips 92 to engage the stops 94. In this lowered position, the stripper member just clears the webs of the cylinder or drum. Further movement of the eccentrics 80 will cause the pitting member or plunger 77 to be lowered to a further extent, with the result that the pitting pins 86 will be moved through the pitting openings of the cylinder or drum and act to remove the pits from any cherries delivered into the enlarged outer ends or pockets 75 of said pitting openings. Before the pitting cylinder or drum is again moved, the eccentrics will have caused the pitting member or plunger to rise, thereby withdrawing the pitting pins from the pitting openings of the cylinder and lifting said pins to bring the lower ends thereof above the plane of the bottom of the stripper member. Thus, if any pitted cherries should adhere to the pitting pins, they will be loosened therefrom and drop into the pockets of the cylinder or drum from which they were withdrawn without being mashed or mutilated. By reason of said plunger engaging the nuts 89 at the upper end of the supporting bolts 88, the guide strips 92 of the stripper member 87 will have been moved upwardly a trifle from their co-acting stops and the clearance between the stripper member and cylinder increased and at approximately that moment, the cylinder or drum will again be rotated. I might here state that for the purpose of assisting in the lifting movement of the pitting member or plunger, retractile springs 98 are provided, the lower ends of which are fastened to the pitting member or plunger, as at 99, and the upper ends to the arched top connector member 22, as at 100.

The pitting pins are grooved lengthwise along their lower portions, as at 101, and the three longitudinal rows of pitting pins are positioned directly above three adjacent longitudinal rows of pitting openings in the pitting cylinder or drum. Consequently, upon rotation of the main or drive shaft 27, the pitting member 77 will be lowered through the medium of the eccentrics 80, eccentric straps 81, and the connecting arms 82, and during this lowering movement the pitting pins are forced through three adjoining longitudinal rows of pitting openings in the cylinder or drum.

102 designates a feed hopper, which has opposite side walls 103, 104, an inclined bottom wall 105 and a short outer end wall 106, the top and inner end of this hopper being open and the inclined bottom wall of the same being adapted to lie in contact or be positioned in close proximity to the pitting cylinder or drum. Extending downwardly and outwardly from the inclined bottom of said hopper, near its outer end, are spaced lugs 107 connected by a web 108, and fastened to the edges of the end members 19 of the frame by means of bolts 109 are brackets 110 through the outer ends of which and the lugs 107 of the hopper, a pivot pin 111 is passed, said pin serving to pivotally support said feed hopper.

Extending through the brackets 110 in spaced relation to the pivot pin 111 is a shaft 112, on which, centrally between said brackets is a cam 113. The shaft 112 has a sprocket wheel 114 secured to one end thereof, and around this sprocket wheel and a second sprocket wheel 115 fastened to a brush shaft 116 is a sprocket chain 117, said sprocket wheel 114 being rotated from the sprocket wheel 115 through the medium of the sprocket chain 117, which is maintained in taut condition by a sprocket idler 118 rotatable on a stud supported in an adjustable bracket 119 fastened to one of the end members 19 by a bolt 120 passed through a slot 121 in said bracket.

On the under side of the inclined bottom wall 105 of the feed hopper, a pair of lugs 122 are formed, which are connected by a web 123 to strengthen the same, and in these lugs a shaft or cylindrical rod 124 is fastened. A roller 125 is rotatably mounted on said shaft or rod 124 in contact with the cam 113. It will be clear therefore that upon rotation of the shaft 112 the cam 113 will be rotated, and this cam acting against the roller 125 will cause the feed hopper to vibrate with the pivot pin 111 as its center of movement. The roller 125 is retained in contact with the cam 113 at all times by a retractile spring 126 fastened at its upper end to a lug 127 on the under side of the inclined bottom wall 105 of the feed hopper and at its lower end to a bolt 128 threaded into a horizontal bar 129 connecting opposite end members 19 of the frame.

Upon rotation of the shaft 112, the cam 113 thereon will cause slight vibrating movement of the feed hopper, with a view of assisting the cherries delivered into said hopper to pass out at the inner open end of said hopper and enter the cherry-receiving pockets 75 of the cylinder or drum, arrangement being provided to deliver cherries into at least three horizontal rows of cherry-receiving pockets at a time. The upper edges of the side walls of said feed hopper are connected together at their inner ends by a cross member 130, and to retard the feeding of the cherries from the feed hopper a transverse depending wall 131 is arranged within the hopper near its inner end, said wall having its lower edges spaced a certain distance from the inclined bottom wall of said hopper, as clearly shown in Fig. 4.

A rotatably adjustable rod 132 extends transversely through the feed hopper, its ends being secured in the side walls of said hopper. To this rod is fastened a gate 133, lugs 134 being provided on said gate at opposite ends thereof through which the rotatably adjustable rod is passed, said rod being fastened within said lugs in any approved manner. By reason of the gate and rod being fastened together, the gate is rotatably adjustable so that one edge thereof may be swung in desired spaced relation to the inclined bottom of the hopper, the space between said edge and the bottom of the hopper being made suitable to the size of the cherries to be pitted. When cherries are delivered into the feed hopper they roll down the inclined bottom of said hopper and pass underneath the rotatably adjustable gate. It will be clear that upon swinging the gate into a position more closely approaching the horizontal than shown in Fig. 4, the space between said gate and the inclined bottom will be enlarged. The adjustment of the gate within the hopper is a simple matter and controls the supply of cherries to the cylinder or drum so that three horizontal rows of cherry-receiving pockets or pitting openings will be supplied with cherries between intermittent rotatable movements of said cylinder or drum.

The shaft 116 is journaled in suitable bearings 135 adjustable in guide brackets 136 fastened to corresponding edges of the end members 19 of the frame, the bearings being transversely alined so that the shaft extends the full length of the frame and is disposed inside of the inner free edges of the side walls of the feed hopper. On this shaft a cylindrical brush 137 is secured, the periphery of which is in close relation to the peripheral face of the pitting cylinder or drum 40, and preferably, the ends of the bristles of the brush travel in contact with the circumferential webs or flanges 73 of said cylinder or drum.

Adjusting screws 138 pass through the end walls of the guide brackets 136 and the inner ends of these screws are rotatably held in the bearings 135 so that upon rotation of said screws, the bearings may be moved outwardly or inwardly, as desired, with a view of adjusting the cylindrical brush with respect to the pitting cylinder or drum.

Figure 13:
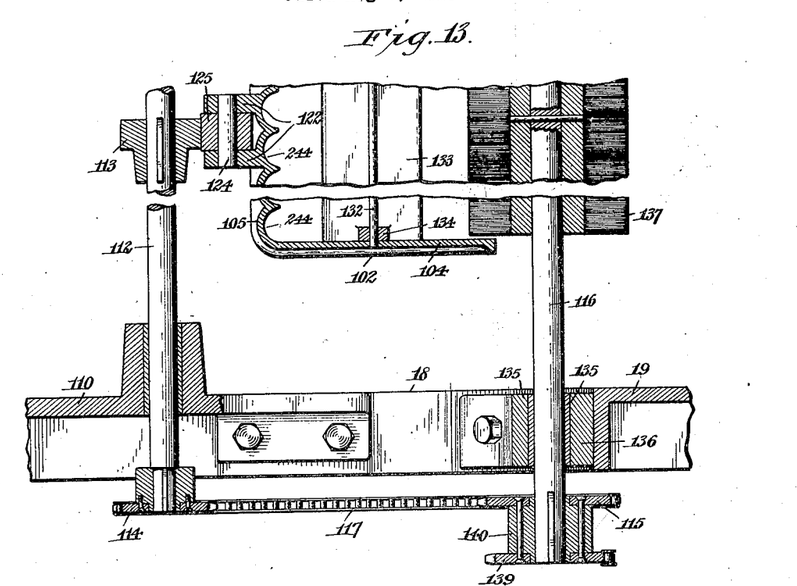
Fig. 13 is an enlarged section taken on line 13—13, Fig. 2, the section being continued through the feed hopper, which and parts directly associated therewith are broken to conserve space.

On the shaft 116 is a second sprocket wheel 139, and in Fig. 13 of the drawings, this sprocket wheel is shown as connected to the sprocket wheel 115 by a connector hub 140, the hub being keyed or otherwise fastened to the shaft 116.

Mounted on the shaft or supporting rod 39 carrying the pitting cylinder or drum 40 is a combined ejector-bar guide and support 141, it having a hub 142 provided with a shaft opening through which said shaft or rod 39 is passed, said guide or support extending upwardly from said hub and having a securing flange 143 formed thereon, and it also extends a distance downwardly from said hub and has a guide slot 144 arranged therein. Said combined ejector-bar guide and support is disposed within the cylinder or drum adjacent its closed end.

Arranged within the pitting cylinder or drum 40 is a pit-receiving box or trough 145, which is fastened at its inner or head end to the flanged upper end of the combined ejector-bar guide and support 141 and supported at its outer or tail end by a tail end-plate 146. This box or trough, as clearly shown in Fig. 6, has a rounded lower portion and upwardly-diverging side walls, and the tail end plate fits between the side walls of said trough to permit of the trough being fastened thereto. For this purpose said tail end-plate has inwardly-extending flanges 147 to permit of screws or rivets to be passed therethrough and through the side walls of the box or trough. Said tail end-plate is extended inwardly at its upper end, as at 148, and this inwardly-extended portion is provided with an upstanding flange 149 through which and the adjacent end member of the frame, securing bolts 150 are passed. The box or trough 145 is therefore firmly fastened in position and at its outer or tail end has a delivery spout or chute 151.

Arranged within the pit-receiving box or trough at the inner or head end thereof is a head end-plate 152, which is provided with an outstanding flange 153 around its entire marginal portion, and by means of this flange said head end-plate is adapted to be secured to the walls of said box or trough. This head end-plate is provided with a bearing 154 which is alined with a bearing 155 at the lower end of the tail end-plate 146, and journaled in these bearings 154 and 155 is a conveyer shaft 156 on which a worm conveyer 157 is mounted, said conveyer rotating within the pit-receiving pocket or trough and being adapted to move the pits delivered thereinto, as will be hereinafter explained, to the spout 151, which is adapted to deliver them into a suitable receptacle (not shown) placed beneath said spout. The conveyer shaft extends outwardly a distance beyond the bearing 155 and to this outwardly extending portion a sprocket wheel 158 is secured, a set screw 159 being used to fasten the same to the shaft. Around this sprocket wheel and a sprocket wheel 160 fastened to the main or drive shaft 27, a sprocket chain 161 is passed, said sprocket chain passing in coacting contact with the sprocket wheel 139 on the brush shaft 116. In this manner the conveyer shaft 156 is rotated from the main or drive shaft and also the brush shaft 116, and by reason of the brush shaft having the sprocket wheel 115 secured thereto this sprocket wheel through the medium of the sprocket chain 117 and the sprocket wheel 114 causes actuation of the cam shaft 112 by means of which the feed hopper is vibrated.

In order to keep the sprocket chain 161 taut and at the same time maintain said sprocket chain in meshing relation with the sprocket wheel 139, an idler sprocket wheel 162 is provided which is in meshing contact with said sprocket chain, said idler sprocket wheel being rotatable on a stud shaft 163 adjustable in a bracket 164 fastened to the edge of one of the end members 19 of the frame directly above the bracket 136 at the same end of the frame in which the bearing 135 of the brush shaft is adjustably held.

Fig. 6 shows the bracket 164 slotted, as at 165, and the stud shaft passes through the slot of this bracket and is maintained in any adjusted position therein by a clamping nut 166 threaded onto the end of said stud shaft.

Figure 4:
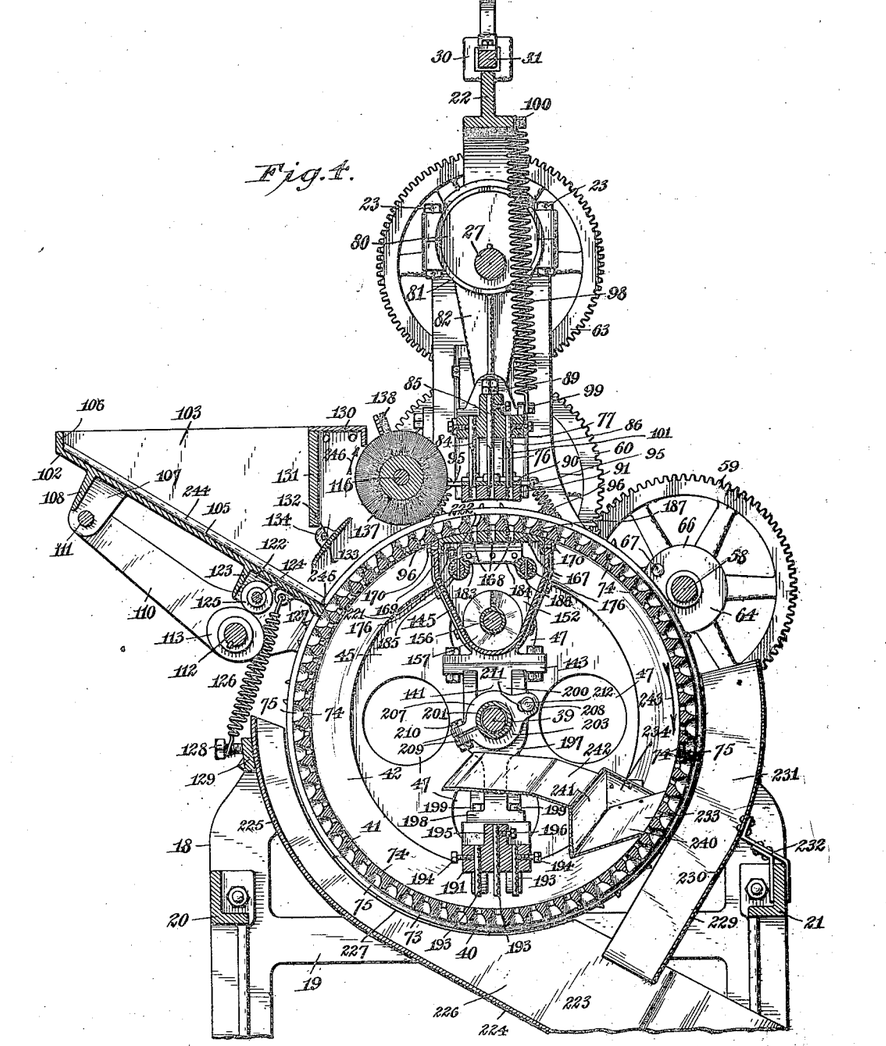
Fig. 4 is an enlarged transverse section taken on line 4—4, Fig. 3.
Figure 5:
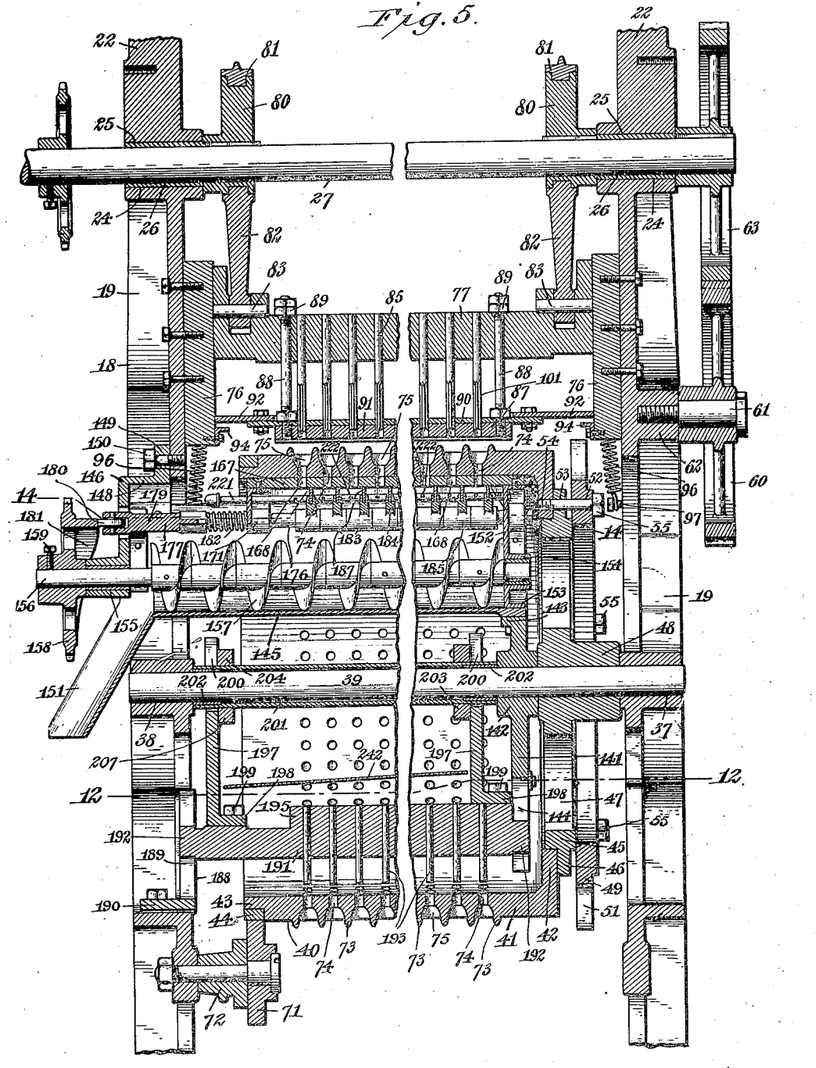
Fig. 5 is an enlarged longitudinal section taken on line 5—5, Fig. 1.
Figure 14:
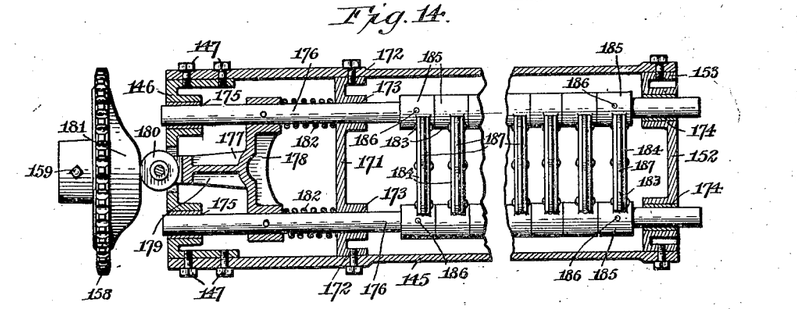
Fig. 14 is a broken horizontal section taken on line 14—14, Fig. 5.
Figures 15, 16:
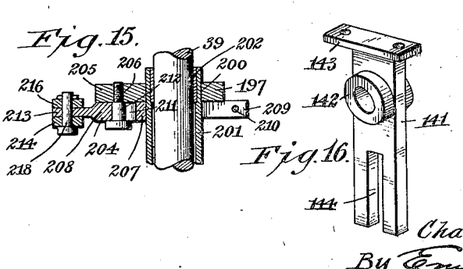
Fig. 15 is a section taken on line 15—15, Fig. 6.
Fig. 16 is a perspective view of one of the depending guides for guiding the movement of the ejector mechanism.

The pit-receiving box or trough 145 is provided with a cover 167 having a flat under side and a transversely convex upper side conforming to the curvature of the inner peripheral wall of the pitting cylinder or drum, as best shown in Fig. 4. This cover is provided with three longitudinal rows of openings 168, adapted for registration with three longitudinal rows of openings in said cylinder or drum when the latter is at rest. Said cover 167 is provided at opposite longitudinal edges with depending flanges 169 through which and the walls of the box or trough 145, screws 170 are passed to fasten the cover between the upper marginal portions of the side walls of said box or trough. One end of this cover is also fastened to the top flange of the head end-plate, as clearly shown in Fig. 5, and to the other end of said cover a depending rod guide 171 is secured, said rod guide being also fastened to the side walls of the box or trough 145, as best shown at 172, Fig. 14.

The rod guide 171 has two spaced guide openings 173 formed therein and the head end-plate 152 has two spaced guide openings 174 formed therein which are alined with the openings 173 in said rod guide. The tail end-plate 146 also has two spaced guide openings 175 alined with the openings 173 in said rod guide and the openings 174 in said head end-plate, and there are therefore two sets of three alined guide openings at opposite sides of the longitudinal center of said box or trough. In each set of guide openings a slidable rod 176 is guided for longitudinal movement and fastened to said rods is a roller yoke 177 having a transverse portion 178, in the ends of which said guide rods are fastened, and a longitudinal portion 179 forked at its outer end to receive a roller 180 adapted for co-action with a cam 181 extending inwardly from the sprocket wheel 158. In order to maintain said roller against the cam 181, spiral springs 182 surround the slidable rods 176 and are interposed between the depending rod guide 171 and the roller yoke 177, opposite ends being in contact with said rod guide and roller yoke, respectively. Said springs exert pressure against said roller yoke and force the yoke outwardly to cause the roller 180 on said yoke to be held in contact with the cam 181 and in contact with the inner surface of the sprocket wheel when said cam moves out of alinement with said roller.

The slidable rods 176 form part of wiping mechanism which include a series of wiper yokes 183. Each wiper yoke comprises a transverse member 184 having depending perforated lugs 185 at opposite ends, through the perforations of which the slidable rods 176 are passed, and pins 186 are passed through the end perforated lugs and the slidable rods to hold the wiper yokes on said rods. Each wiper yoke is grooved along its upper edge to receive a flat wiper element 187, constructed of rubber or other suitable material, said wiper element being riveted, or otherwise fastened within said grooves. It will be apparent therefore that when the sprocket wheel 158, which may be termed a combined sprocket and cam wheel, is rotated, the cam 181 of said wheel will cause inward movement of the roller yoke 177, and consequently movement of the slidable rods 176 in a like direction, with the result that the upper edges of the wiper elements 187 will move in contact with the under side of the cover 167 of the pit-receiving box or trough 145, and that a reverse movement of said wiper elements takes place when the cam 181 moves away from said roller, which reverse movement is caused by the springs 182 surrounding said slidable rods.

The wiper yokes, or wipers, as they may be termed, have their lugs 185 in contact end to end, and these wipers are spaced to conform to the spaces between the circumferential rows of pitting openings in the pitting cylinder or drum 40. Consequently, with each inner and outward movement of these wipers, each wiper traverses a circumferential row of pitting openings, and unless otherwise particularly referred to, the openings 168 in the cover 167 are included in the term "pitting openings", since, as stated, they are in registration with the pitting openings in the cylinder or drum when the latter is at rest.

Arranged within the cylinder or drum at the closed end thereof and co-acting with the combined ejector bar guide and support 141 is an ejector bar guide 188 which is in the form of a bracket having a slotted vertical member 189 and a base 190 from which said vertical member rises, said base being fastened to the end member 19 of the frame adjacent the open end of said cylinder or drum. It will be noticed that the guide slot in said ejector bar guide 188 opens upwardly while the guide slot 144 in the combined ejector bar guide and support 141 opens downwardly.

The reference numeral 191 designates an ejector bar arranged lengthwise within the cylinder or drum 40 and extending outwardly beyond the open end of said cylinder or drum, each end of said ejector bar having a guide lug 192, one of which is entered in the guide slot of the combined ejector bar guide and support 141 and the other in the guide slot of the ejector bar guide 188. In this manner the end portions of said ejector bar are shouldered and the shoulders are in sliding contact, respectively, with the inner faces of the combined ejector bar guide and support 141 and the ejector bar guide 188, thus preventing lengthwise movement of said ejector bar.

The ejector bar 191 is provided with three longitudinal rows of ejector pins 193, the two outer rows of which are held securely within the ejector bar by screw bolts 194 threaded into said ejector bar from opposite longitudinal edges and bearing firmly against the ejector pins, while the center row of ejector pins extend through an upward extension 195 on said ejector bar and are held by screw bolts 196 threaded into said upward extension from one side thereof and bearing against said pins.

Fastened to the upper side of the ejector bar 191 are lifter arms 197, one being near each end of said ejector bar. Each lifter arm comprises a straight vertical member having a flange 198 at its lower end through which bolts 199 are passed that take into the ejector bar 191, and at the upper end each lifter arm is provided with an upwardly-opening slot 200.

Surrounding the shaft 39 of the cylinder or drum and extending through the slots of said lifter arms is a rocker sleeve 201 which extends from the combined ejector bar guide and support 141 outwardly through the open end of the pitting cylinder or drum to the end member 19 of the frame adjacent said open end, the internal diameter of said rocker sleeve being of greater diameter than said shaft 39 and being spaced therefrom along its entire length; but at each end it is provided with bearing bushings 202 rotatable with said sleeve and on said shaft 39.

Clamped on the rocker sleeve in movable contact with the lifter arms 197 at the closed end of the cylinder or drum is a rock arm 203, and a similar rock arm 204 is clamped on said rocker sleeve in moving contact with the other lifter arm arranged outside of said cylinder or drum.

Figure 17:
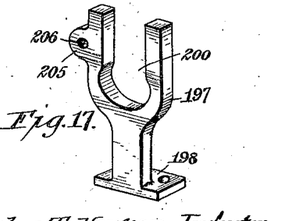
Fig. 17 is a perspective view of one of the upstanding guides of the ejector mechanism.

As clearly shown in Fig. 17, each of the lifter arms 197 has a lug 205 at one edge thereof near its upper end which is provided with a tapped opening 206 and each of the rock arms has a ring-like body portion 207 provided with a radial arm 208. At a point diametrically opposite the radial arm of each rock arm, said ring-like body portion thereof is slit and provided with two lugs 209 through which a clamping bolt 210 is passed. The rocker sleeve 201 is clamped within the openings in the ring-like body portions of said rock arms when the bolts 210 are tightened. Each of the rock arms has an elongated bolt hole 211 through which a screw bolt 212 is passed, said screw bolt being threaded into the tapped opening 206 formed in the lug 205 of the co-acting lifting arm 197.

The rock arm 204 has an outward extension 213 to which the lower end of a connecting rod 214 is pivotally secured, said rod comprising an intermediate rod portion 215 threaded at opposite ends, and opposite heads 216 threaded to receive the threaded ends of said intermediate rod portion, two nuts 217 being threaded onto said rod portion and bearing against the inner ends of said head. By means of this arrangement the connecting rod may be lengthened or shortened. The outer end of said head 216 is forked, the lower forked head being adapted to straddle the extension 213 on the rock arm 204 and being fastened thereto by a pivot 218. The forked end of the upper head of said connecting rod straddles and is pivotally connected to an arm 219 extending outwardly from the bracket 220 fastened to one end of the pitting member 77 so that upon vertical reciprocation of said pitting member the rock arm 204 is caused to rock upwardly and downwardly through an arc of a circle, with the result that the rocker sleeve 201, to which said rocker arm 204 is clamped, is caused to rock on the shaft 39, and by reason of the rock arm 203 being clamped to said rocker sleeve, said last-mentioned rocker arm will also rock back and forth through an arc of a circle. The rocking of these rocker arms cause vertical reciprocating movement of the lifter arms 197 to which the ejector bar 191 is fastened, with the result that the three rows of ejector pins depending from said ejector bar are caused to enter three longitudinal rows of pitting openings in the pitting cylinder or drum at the lowest point thereof. The movement of the ejector mechanism is therefore synchronized with the movement of the pitting mechanism.

Arranged within the pitting box or trough 145 is a perforated water pipe 221 which is arranged lengthwise along corresponding ends of the several wiping elements 187 of the wiper mechanism, and this pipe is provided with jet openings 222 positioned to direct jets of water across the upper portion of the pitting box or trough and against the under side of the cover of said box or trough. This pipe has connection at one end, with a suitable source of water supply delivered under proper pressure to said pipe.

Arranged underneath the pitting cylinder or drum is a cherry discharge spout 223 having a straight inclined bottom wall 224 along its lower portion and being directed upwardly in curved formation at its upper end, as at 225 to conform to the exterior formation of the pitting cylinder or drum. This spout has side walls 226 extending from end to end thereof which are cut away along their upper ends, as at 227, to lie in close proximity to the pitting cylinder or drum, as best shown in Fig. 4. The upper end of this discharge spout receives support from the horizontal supporting bar 129 and, if desired, may be fastened thereto. Near its lower end said spout rests upon and is fastened to a portion of the connecting member 21 connecting opposite end members of the frame, screws 228 being passed through the inclined bottom wall of said spout and taking into said connecting member.

In connection with the discharge spout, a cherry-receiving spout 229 is provided which is arranged at one side of the pitting cylinder or drum and extends downwardly into the cherry-discharge spout. This cherry-receiving spout has an outer wall 230 and side walls 231, the upper portion of this receiving spout being curved to conform to the curvature of said cylinder or drum so that the edges of the side walls, at their curved portions, are in close proximity to the peripheral wall of said cylinder or drum. This receiving spout has brackets 232 fastened thereto which engage the upper edge of the connecting member 21 and retain the cherry-receiving spout in fixed position.

Figure 2:
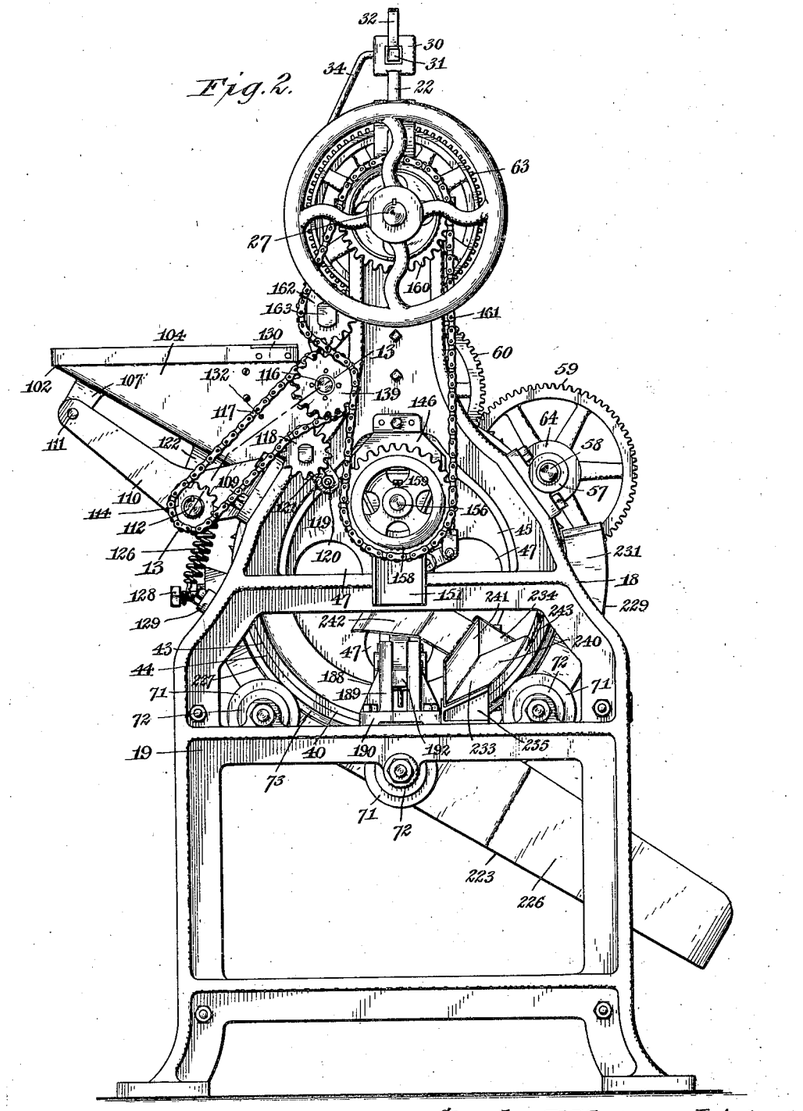
Figures 10, 11, 12:
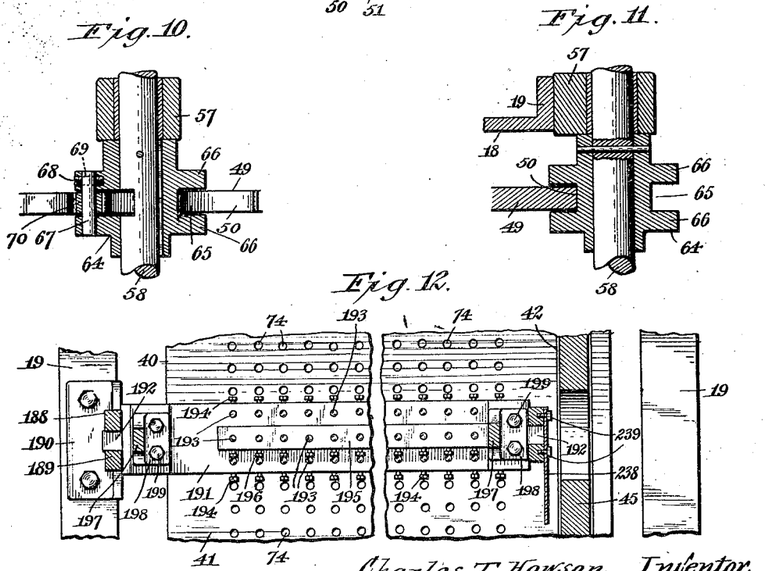
Fig. 10 is an enlarged section taken on line 10—10, Fig. 9.
Fig. 11 is an enlarged section taken on line 11—11, Fig. 9.
Fig. 12 is a horizontal section taken on line 12—12, Fig. 5.

Arranged lengthwise within the pitting cylinder or drum is a combined scraper and discharge spout 233, it having a V-shaped spout portion closed at its inner end, as at 234 and opened at its other end, the open end extending outwardly beyond one of the end members 19 of the frame. The outer end of said spout rests upon an inclined support 235 seated on a part of said end member, and this inclined support has a depending flange 236 lying against the inner side of said end member and being fastened thereto by a bolt 237. The closed inner end of said spout is fastened to a supporting bar 238 extending therefrom and having its outer end fastened to the outer side of the combined ejector bar guide and support 141, as at 239, best shown in Figs. 1 and 12. In this manner the combined scraper and discharge spout is maintained in a fixed position and it has the outer longitudinal edge of its inclined wall 240 curved or otherwise fashioned to conform to the formation of its line of contact with the inner face of the cylindrical wall of the pitting cylinder or drum. Extending from the upper edge of the opposite vertical wall 241 of said combined scraper and spout is an apron 242 adapted to protect parts beneath from any juices or foreign matter dropping from parts above the same. The scraping edge of the inclined wall 240 is in contact with the downwardly moving side of the pitting cylinder or drum, which rotates in the direction of the arrows 243 shown in Figs. 1, 2 and 4.

I preferably flute the inclined bottom wall of the feed hopper 102, as best shown in Fig. 13, thereby forming longitudinal grooves 244 on the inner side of said inclined bottom which register with the circumferential series of pitting openings in the cylinder or drum, and the inner end of said inclined wall is notched at regular intervals along its edge, as at 245, to receive the circumferential webs or flanges of said cylinder or drum.

Cherries delivered into the feed hopper 102 are retarded in their escape therefrom by the depending wall 131 and the rotatably adjustable flat gate 133, and these cherries pass out of the feed hopper in longitudinal rows due to the fact that the inclined bottom of the hopper is longitudinally grooved to conform to the circumferential grooves created by the webs or flanges 77, and in which latter grooves the cherry-receiving pockets and pitting openings are arranged.

The flat gate 133 is adjusted to allow one layer of cherries at a time to be delivered to the cherry-receiving pockets 75 of the pitting cylinder or drum, and during the operation of the machine, the cherry pitting cylinder or drum moves the distance of three longitudinal rows of cherry-receiving pockets. Consequently, the cherries roll down the inclined bottom of the feed hopper to fill one of the three longitudinal rows after the other. By intermittent rotary movement of the pitting cylinder or drum, these cherries are carried upwardly underneath the stripper member 89, and any cherries that may be carried up by the pitting cylinder or drum which have not found proper lodgement in the cherry-receiving pockets of the pitting cylinder or drum, will be returned to the inner end of the inclined bottom of the feed hopper by the cylindrical brush 137, which rotates in the direction of the arrow 246, shown in Fig. 4. This brush is to be adjusted to allow the passage of only the layer of cherries underneath the same when located within the cherry-receiving pockets of the cylinder or drum.

It is apparent, therefore, that this improved machine is designed to supply three longitudinal rows of cherries to the pitting cylinder or drum, and also pit three rows with each operation of the machine, and it will be understood that all cherry-receiving pockets extending from the inner end of the inclined bottom of the feed hopper upwardly to and including the three longitudinal rows at the crest of the cylinder or drum will be filled with cherries adapted to be pitted by the pitting mechanism, and that the intermittently operating mechanism, herein shown as a Geneva movement, but which, under the broad principle involved, may be any other intermittent mechanism, rotates the pitting cylinder or drum at each intermittent movement a distance of three longitudinal rows of pitting openings; also that during each period of rest of said pitting cylinder or drum, the pitting operations take place.

With cherries in the cherry-receiving pockets at the crest of the cylinder or drum and the cylinder or drum held at rest, the pitting pins 84, 85 and 86 are lowered by the eccentric mechanism on the main or drive shaft 27, and during the initial downward movement of said pitting pins, the stripper member is drawn downwardly by the retractile springs 96, which is permitted by reason of the pitting member or plunger 77 moving downwardly so that the nuts 89 on the supporting bolts 88 can follow in the downward movement, after which the pitting pins and necessarily the pitting member or plunger from which said pins depend, move downward independently of the stripper member so that said pitting member or plunger travels downwardly on the guides 76 and on the supporting bolts 88. The pitting pins, in passing downwardly, travel through the three longitudinal rows of cherries beneath the stripper member and force out the pits, which are carried through the pitting openings and also through the openings 168 in the cover of the pit-receiving box or trough 145, said openings 168 in reality being part of the pitting openings in the cylinder or drum when brought into alinement therewith.

The pits forced out of the cherries are delivered into the pit-receiving box or trough 145 and conveyed outwardly therefrom by the worm conveyer 157, said conveyer actuating to move the pits to the outer end of said box or trough where they are carried by the delivery spout or chute 151 into a suitable receptacle placed underneath the same. The worm conveyer is driven continuously from the main or drive shaft 27 through the medium of the sprocket wheels 158, 160 and sprocket chain 161.

Between pitting operations, the wiper mechanism is brought into action, and therefore operation of the wiper mechanism is intermittent, the action being a reciprocating action induced by the cam 181 on the sprocket wheel 158. As clearly shown in Fig. 14, this cam extends along a portion of a circular path on the inner side thereof so that the roller 180 on the wiper mechanism travels up onto the cam and off the same during each portion of a revolution of said sprocket wheel, and during this action the slide rods 176 carrying the flat wiper elements 187 are caused to reciprocate. While the roller travels in contact with a portion of the sprocket wheel 158 between the ends of the cam 181, the wiper mechanism remains inactive. During the reciprocating movement of the wiper mechanism, the flat wiper elements 187 move in contact with the under side of the cover of the pit-receiving box or trough, and any pits or meaty substances adhering to the under side of said cover or depending from the walls of the openings in said cover, are removed, and this is assisted by the jets of water issuing from the water pipe 221. This wiping action takes place during the time that the pitting cylinder or drum moves the three pitted rows of cherries from underneath the stripper member 87 and moves three unpitted rows of cherries underneath said member, and this slight movement of the pitting cylinder or drum is caused by mechanism interposed between the main or drive shaft and the element 49 secured to the inner closed end of the pitting cylinder or drum. In preferred form, said element is the driven wheel forming part of a Geneva movement, which driven wheel is in mesh with a drive wheel, also of such movement, fastened to a shaft driven through the medium of the gear wheels 59, 60 and 63 from the main or drive shaft.

As the pitted cherries are carried downwardly, they automatically release themselves from the pitting cylinders or drums, and gravitate into the receiving spout 229, from which they are delivered into the discharge spout 223, and from the latter are directed outwardly from the machine to a suitable receptacle placed underneath the outer or free end of said spout.

While the wiper mechanism within the pit-receiving box or trough 145 will dispose of all adhering matter from the cover of said box or trough, and may even draw out matter adhering to the walls of the pitting openings formed directly in the cylinder or drum, the combined scraper and spout 233 positioned within the pitting cylinder or drum will serve to scrape any adhering matter from the inner surface of the cylinder or drum, which matter will move downwardly along the outer inclined wall 240 of said spout, and be delivered by said spout outwardly from one end of the machine. Any matter dropping from above will be received by the apron of said combined scraper discharge spout, and by reason of the inclined position of said apron, be directed into said spout.

It will be apparent therefore that the cherries are automatically delivered from the feed hopper to the pitting cylinder or drum and are pitted while retained within said cylinder or drum; that the pits are removed and delivered to a common point; that the cherries are also automatically delivered from the pitting cylinder or drum, and by suitable spouts carried to a common point; and that the cylinder or drum is maintained in a condition free of all adhering matter so that cherry-receiving pockets, and the pitting openings, of which said pockets are enlargements, are freed of all cherries and cleared of all adhering matter so as to receive further cherries upon being brought around to the feed hopper. It will also be apparent that the cherries will be effectively delivered from the feed hopper by reason of the use of vibrating mechanism, including the roller 125 and the cam 113, which latter is operated by the sprocket wheel 114 driven from the sprocket wheel 115 through the medium of the sprocket chain 117. The shaft on which said sprocket wheel 115 is fastened, is driven from the main or drive shaft through the medium of the sprocket chain 161. The parts of this machine operated by the sprocket chains 117 and 161 are continuously operated parts, and these parts are driven from one end of the machine while the intermittently operated parts are driven from the opposite end of the machine.

Any pitted cherries not self-freed and therefore remaining in the cherry-receiving pockets of the cylinder or drum when they reach the lowermost point or travel, are removed therefrom by the ejector pins forming part of the ejector mechanism, which mechanism is operated directly from the pitting mechanism through the medium of the connecting rod 214. The pitted cherries so removed by the ejector mechanism are delivered directly into the discharge spout 223 and pass out of the machine the same as those received by said discharge spout which have freed themselves from the cylinder or drum.

Manifestly, a machine having the number of parts illustrated and described and embodying certain principles of operation whereby large capacity is assured, may be modified in various ways without departing from this invention or sacrificing any of the principles involved therein.

Having thus described my invention, what I claim is:—

1. A cherry pitting machine, comprising a frame having end members and a top connector member, a drive shaft journaled in said end members, pitting mechanism supported by said frame beneath said drive shaft and having its operating parts driven from said drive shaft, a tight pulley on said drive shaft, a loose pulley on said drive shaft adjacent said tight pulley, guide loops on said top connector member, a shifter bar slidably arranged within said guide loops, and a shifter arm extending downwardly in proximity to said pulleys and adapted to be moved within the range of one or the other of said pulleys by said shifter bar.

2. A cherry pitting machine, comprising a frame having end members and a top connector member, a drive shaft journaled in said end members beneath said top connector member, pitting mechanism supported by said frame beneath said drive shaft and operated thereby, a tight pulley and a loose pulley on said shaft adapted to have a belt travel around one or the other, spaced guide loops extending upwardly from said top connector member, a shifter bar slidable in said guide loops and having stops thereon limiting opposite movements thereof, a shifter arm formed of rod material bent into U-shape and having a portion curved to conform to the curvature of said pulleys, the free ends of said shifter arm being passed through said shifter bar, and set screws threaded into said shifter bar and bearing against the portions of said shifter arm extending through said shifter bar.

3. In a cherry pitting machine, wiper mechanism comprising two spaced supported slide rods, wipers bridging the space between said slide rods and having flat wiper elements secured thereto, a yoke spanning the space between said slide rods and connected thereto, a depending rod guide having a fixed position and through which said slide rods are passed, springs surrounding said slide rods and bearing with corresponding ends against said rod guide and with their other ends against said yoke, and means engaging said yoke to move said slide rods against the action of said springs.

4. In a cherry pitting machine, a pit-receiving trough closed at one end and having its other end open, a pair of spaced slide rods slidably arranged at one end within the closed end of said trough, a support at the other end of said trough in which the opposite ends of said slide rods are slidably mounted, a support arranged within said trough in spaced relation to said last-mentioned support and having said slide rods slidably mounted therein, a yoke spanning the space between said slide rods and connected at opposite ends thereto, a spiral spring surrounding each slide rod and bearing with one end against said second-mentioned support and at its other end against said yoke, a roller mounted on said yoke, wiper elements attached to said slide rods, and a cam adapted for co-action with said roller.

5. A cherry pitting machine, comprising an intermittently rotatable cylinder having pitting openings, pitting mechanism above said cylinder, a spout at one side of said cylinder and extending downwardly along the same, said spout being adapted to receive pitted cherries from said cylinder, and a cherry-discharge spout underneath said cylinder extending laterally and downwardly and receiving the pitted cherries from said first-mentioned spout.

6. A cherry pitting machine, comprising an intermittently rotatable pitting cylinder having pitting openings therein, pitting mechanism disposed above the crest of said cylinder, a cherry-receiving spout having a curved portion at its upper end conforming to the curvature of said cylinder and a straight portion extending downwardly and inwardly from said curved portion, said cherry-receiving spout being arranged at one side of said cylinder, and a cherry discharge spout extending inwardly and downwardly from the opposite side of said cylinder and receiving the cherries from said receiving spout.

7. A cherry pitting machine, comprising a frame having spaced end members and connector members connecting the lower portions of said spaced end members, a horizontal supporting bar connecting said end members above one of said connector members, a pitting cylinder rotatably mounted in said frame between said end members, pitting mechanism arranged above said cylinder, a cherry-receiving spout arranged at one side of said cylinder and having a bracket secured thereto adapted for engagement with one of said connector members, and a cherry discharge spout extending downwardly from the opposite side of said cylinder and receiving support from said horizontal supporting bar, said cherry discharge spout receiving the cherries from said cherry-receiving spout.

8. A cherry pitting machine, comprising a frame, a rotatable pitting cylinder carried by said frame, a feed hopper having a curved inner end and being provided with an inclined bottom, an outer end wall and opposite side walls, a cam shaft rotatably mounted on said frame, a cam on said shaft, a roller rotatable on said feed hopper beneath the inclined bottom thereof, and a spring for holding said roller in contact with said cam.

9. A cherry pitting machine, comprising a frame having spaced end members, an intermittently rotatable pitting cylinder between said end members, brackets extending from said frame, a feed hopper having a curved inner end conforming to the curvature of said pitting cylinder and in close proximity thereto, said feed hopper being pivotally secured near its outer end to said brackets, a roller carried by said feed hopper near its inner end, a shaft carried by said brackets, a cam on said shaft for co-action with said roller, and a retractile spring having one end secured to said feed hopper and its other end secured to a fixed point on said frame and serving to maintain said roller in contact with said cam.

10. In a cherry pitting machine, a pitting cylinder having pitting openings therein, wiper mechanism positioned within said pitting cylinder, and scraping mechanism in contact with the inner periphery of said cylinder in a plane beneath said wiper mechanism.

11. A cherry pitting machine, comprising a pitting cylinder having pitting openings therein, wiper mechanism within said cylinder extending along the upper portion thereof and adapted to loosen adhering pits, and a trough-like scraping device in a plane beneath said wiper mechanism having the edge of one of its walls in scraping contact with the inner periphery of said pitting cylinder and being inclined to deliver any substance scraped from said cylinder to a point outside of said cylinder.

12. In a cherry pitting machine, a pitting cylinder having spaced circumferential flanges providing grooves therebetween and cherry pitting pockets arranged in circular series within said grooves, and a feed hopper having an inclined bottom wall notched along its inner edge to receive the flanges of said pitting cylinder.

13. In a cherry pitting machine, a pitting cylinder adapted for rotatable movement and having spaced circumferential flanges providing circumferential grooves therebetween, said pitting cylinder having a circumferential series of cherry-receiving pockets in each of said circumferential grooves, and a feed hopper having an inclined bottom provided with parallel grooves alined with the grooves of said pitting cylinder and with notches at the inner edge of said inclined bottom to receive the circumferential flanges of said pitting cylinder.

14. A cherry pitting machine, comprising a frame, a pitting cylinder within said frame having pitting openings and mounted for intermittent rotary movement, pitting mechanism above said cylinder, an ejector bar extending lengthwise within said cylinder along the lower portion thereof and guided for vertical movement at opposite ends, ejector pins carried by said ejector bar, rocker arms, lifter arms rigidly secured to said ejector bar and extending upwardly therefrom, said lifter arms being pivotally connected with said rocker arms, and a connecting rod pivotally connected at one end to one of said rocker arms and at its other end having connection with said pitting mechanism.

15. A cherry pitting machine, comprising a frame having spaced end members, a shaft having opposite ends held within said end members, an intermittently rotatable pitting cylinder on said shaft, a sleeve surrounding said shaft and rockable thereon, rock arms fastened to said sleeve in spaced relation, reciprocating pitting mechanism above said cylinder, ejector mechanism guided at opposite ends for reciprocating movement, lifter arms secured to said ejector mechanism and having forked upper ends straddling said sleeve, said lifter arms being pivotally connected to said rock arms, and a connecting rod pivotally connected at one end to one of said rock arms and having pivotal connection at its other end with said pitting mechanism.

16. A cherry pitting machine, comprising a frame having spaced end members, a shaft held against rotation in said end members, a pitting cylinder open at one end and having its other end closed, means for intermittently rotating said pitting cylinder, vertically reciprocating pitting mechanism above said pitting cylinder, a guide support carried by said shaft within said pitting cylinder at the closed end thereof and having a guide slot at its lower end, a guide secured to one of said end members and having a guide slot therein, an ejector bar extending lengthwise along said pitting cylinder within the lower portion thereof and having pitting pins therein, said ejector bar having opposite ends guided for movement in the guide slots of said guide supports and guides, respectively, lifter arms secured to said ejector bar and having forked upper ends, a sleeve surrounding said shaft and rockable thereon, said sleeve extending through the forked upper ends of said lifter arms, rock arms fastened to said sleeve and connected to said lifter arms, and a connecting rod pivotally connected at its lower end to one of said rock arms and having pivotal connection at its upper end to said pitting mechanism.

17. In a cherry pitting machine, the combination with a pitting cylinder, of a pit-receiving trough within said pitting cylinder, wiper mechanism within said pit-receiving trough, and means for directing jets of water across the upper portion of said trough.

18. In a cherry pitting machine, the combination with a pitting cylinder, of a pit-receiving trough extending lengthwise within said pitting cylinder and having a cover in contact with the inner surface of said cylinder, and means for directing jets of water across the upper portion of said trough and against the under side of said cover.

19. In a cherry pitting machine, the combination with a pitting cylinder, of a pit-receiving trough arranged lengthwise within said cylinder along the upper portion thereof, wiper mechanism in said trough, and a perforated pipe extending along the length of said trough and adapted to direct jets of water against said wiper mechanism.

20. A cherry pitting machine, comprising an intermittently rotatable cylinder having pitting openings, pitting mechanism above said cylinder, a spout at one side of said cylinder and extending downwardly along the same, and a cherry discharge spout underneath said cylinder receiving the pitted cherries directly from said first-mentioned spout.

In testimony whereof I affix my signature.

CHARLES T. HOWSON.